Feb. 9, 1971 R. W. KIESS 3,561,878
DIRECT READING COLORIMETER
Filed Dec. 21, 1967
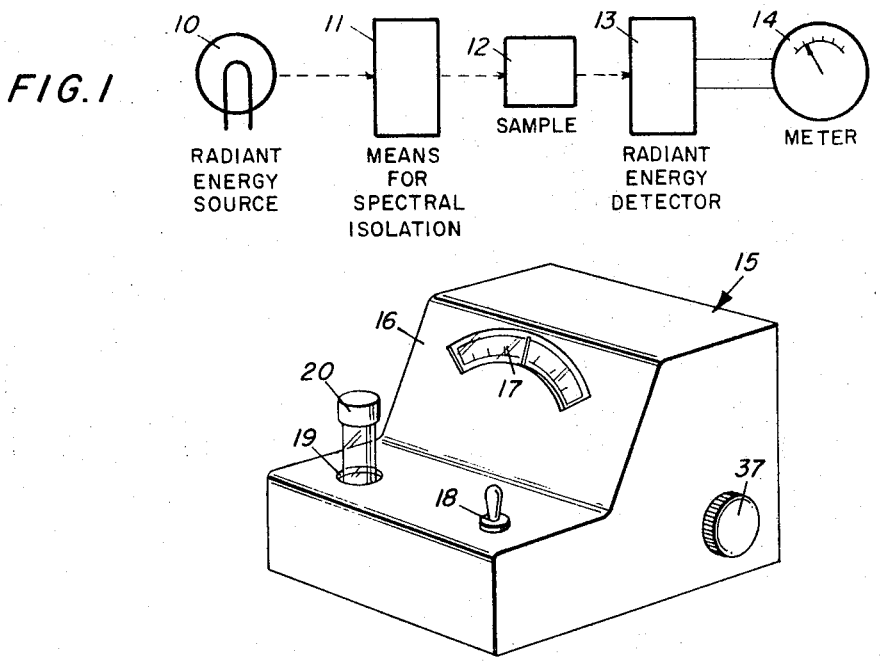
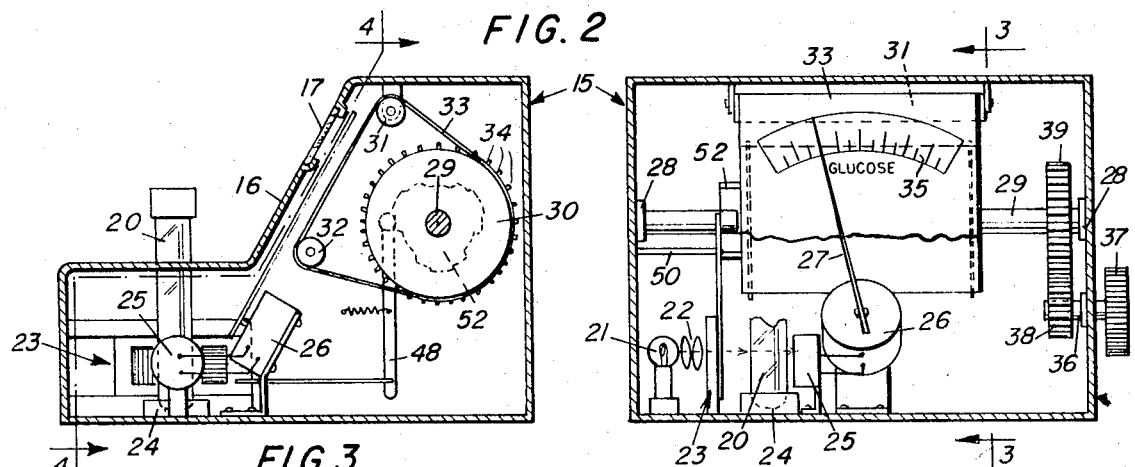
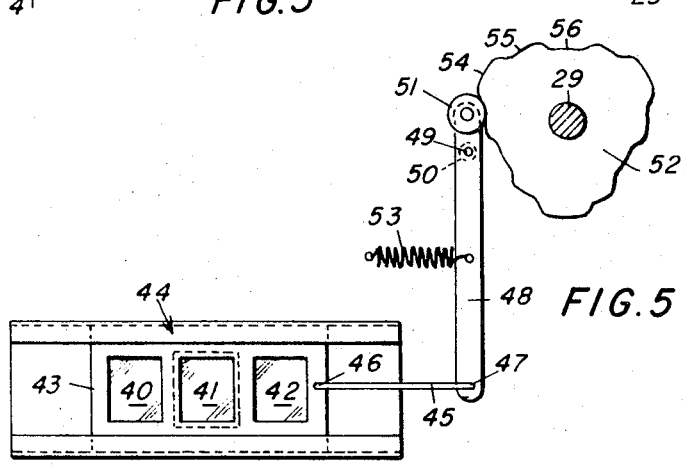
INVENTOR
RAYMOND W. KIESS
BY Christen, Sabol, O'Brien & Caldwell
ATTORNEYS ми
United States Patent Office 3,561,878
Patented Feb. 9, 1971

3,561,878
DIRECT READING COLORIMETER
Raymond W. Kiess, Miami, Fla., assignor to Kiess Instruments, Inc., Miami, Fla., a corporation of Florida
Filed Dec. 21, 1967, Ser. No. 692,525
Int. Cl. G01j 1/42, 3/48
U.S. Cl. 356—184                    12 Claims

ABSTRACT OF THE DISCLOSURE

A direct reading colorimeter for chemical analysis is provided with a plurality of meter scales and a plurality of color filters with interlocking means for automatically selecting the scale and filter appropriate to the specific analysis to be performed.

---

This invention relates to the chemical quantitation or quantitative analysis of certain constituents present in blood, urine and other body fluids that are of significant interest to the medical and health professions, for the detection of pathological conditions of the human or animal bodies and also as a guide to dictate therapy as well as serving as a parameter to judge prognostically as to the state of health or morbidity of the organism.

Procedural simplification, from a viewpoint of chemical analysis, as well as instrumentation, has resulted as the development of the state of the art has progressed.

Simply stated, biochemical colorimetry is based upon the measurement of color developed by certain chemical reactions, the color developed usually being stoichiometrically related to the concentration of the constituent being analyzed.

In the early years of biological or clinical chemistry, the colors developed in a chemical reaction were compared visually with those of known concentrations. Thus, the unknown constituents could be approximated and the results could even be interpolated in certain instances.

The twin-cup type visual colorimeter followed and a split-field comparator was used to indicate an approximation of color equilibrium, the concentration being related to the relative depts of immersion of the optical probes.

Later, a filter photometer evolved which used a filter to isolate the useable and desired portion of the spectrum, and later prisms, diffraction gratings and interference filters were introduced, all of which greatly increased the sensitivity, specificity, reproducibility, and accuracy of the procedure. It also removed the human element from matching colors visually.

Other instruments also evolved utilizing the ultraviolet and infra-red portions of the spectrum.

As the state of the art progressed, different chemical formulations of reagents which were more specific and possessed more desirable stability characteristics were developed. Until this stage was reached, different batches of reagents had to be tested and graphs constructed to relate color development to terms of concentration.

The art has now evolved to the point that colorimeter or spectrophotometer scales can be directly calibrated to be read in terms of concentration, rather than to take a reading from the meter and refer to a calibration table, or graph, to relate this reading to meaningful terms of concentration. Methods have also been introduced whereby a single calibrated meter with a keying mechanism can be inserted in a colorimeter, thus making certain that the appropriate filter is properly positioned in the light beam or, several scales can be inscribed on the meter face with no provision made for the changing of filters.

It is quite apparent that the first of the two approaches mentioned in the previous paragraph has the limitation of cost because a separate meter movement must be used for each particular test, as well as being awkward and cumbersome and, that the latter approach is limited because of physical limitations as to the number of arcs capable of being inscribed thereon are limited to four or five, and the lack of any provision for selecting the proper filter.

The present invention relates to a direct reading colorimeter and describes apparatus that will allow the selection of a suitable scale in terms of the constituent to be quantitated, as well as the selection of an appropriate filter, in a simple and reliable manner so as to leave no opportunity for error.

Other objects and advantages will be apparent to those skilled in the art after reading the following specification in connection with the annexed drawings in which;

FIG. 1 is a diagrammatic representation of the basic components of a photometer spectrophotometer and FIG. 2 is an isometric view of a preferred form of colorimeter construction in accordance with the teachings of the present invention, FIG. 3 is a cross-sectional elevation of the device of FIG. 2 taken on the line 3—3 of FIG. 4. FIG. 4 is a cross-section taken on the line 4—4 of FIG. 3, and FIG. 5 is a fragmentary view of an enlarged scale of the camming mechanism use for shifting the filter means.

FIG. 1 represents, in diagrammatic form, the usual arrangement of components which comprise a colorimeter for spectral analysis of a liquid sample, in which numeral 10 indicates generally a source of radiant energy such as an electric lightbulb, numeral 11 indicates a filter for isolating portions of the visible spectrum which is placed in the path of light from the source so as to pass through a sample of liquid to be analyzed, indicated by numeral 12, after which the light impinges upon a radiant energy detector, or transducer means, indicated generally by numeral 13, capable of transforming received light energy into electrical energy in proportion to the intensity of radiant energy impinging upon the detector, this intensity being noted in terms of electrical energy by means such as the meter, indicated generally by numeral 14.

The table set forth below gives an idea of the numerous tests which may be conducted upon liquid samples wherein it is preferable in each case to employ a radiant energy source having a specific optimum wavelength for each test.

This table shows the numerous constituents that may be measured, the optimum wavelength of the filler to be used, and the procedural references. This list is shown for reference only and does not mean to infer that either the procedural reference and wavelength indicated, or test for constituents are a limiting factor, as other suitable test procedures and associated wavelengths could be interchanged or different constituents altogether could be quantitated without detracting in any manner from either the uniqueness or value of this invention.

| Constituent | Optimum wavelength for quantitation, mu. | Procedural reference |
| --- | --- | --- |
| Serum glutamic oxalacetic transaminase | 505 | Frankel et al. |
| Serum glutamic pyruvic transaminase | 505 | Do. |
| Hemoglobin | 540 | Drabkin. |
| Urea nitrogen | 540 | Berthelot. |
| Cholesterol | 640 | Liebermann-Burchardt. |
| Glucose | 540 | Washko, Rice. |
| Bilirubin | 540 | Malloy, Evelyn. |
| Alkaline phosphatase | 660 | Bodansky. |
| Acid phosphatase | 660 | Do. |
| Icterus index | 420 | Meulengracht. |
| Thymol turbidity | 640 | Kunkel, Hoagland. |
| Calcium | 550 | Connerty, Riggs. |
| Inorganic phosphorus | 660 | Fiske, SubbaRow. |
| Protein | 540 | Biuret. |
| Albumin | 615 | Rodkey. |
| Zinc sulfate turbidity | 650 | Kunkel. |
| Uric acid | 660 | Henry, Caraway. |
| Lipids | 640 | Kunkel, Ehrens, Eisenmenger. |

Moreover, while the foregoing table indicates that there are optimum values for the light waves used in each of the tests to be conducted, the usual colorimeter is provided with only a single filter designed to pass light rays having a broad spectrum of frequency and thus it will be realized that, even if a number of interpolation tables are provided (based on the known frequency of the single filter) a sacrifice of accuracy will result. On the other hand, even if the colorimeter is provided with several interchangeable filters, a separate interpolation table is required for each test.

Thus it is one purpose of the present invention to provide, not only a means for supplying a plurality of calibrated scales for a meter to enable the percentage of constituent substances to be read directly from the deflection of the meter pointer, but also to provide a plurality of filter means to enable tests for each constituent material to be conducted with a light source having the optimum wavelength for that material in accordance with the procedure appropriate for each analysis.

Therefore, a preferred embodiment of the invention comprises a housing, indicated generally by numeral 15 in FIG. 2, having a front panel 16 provided with a transparent window 17, a switch 18 for controlling the supply of electricity to the device and a suitable opening 19 to permit the insertion therein of a cuvette 20 and containing a sample (not shown) of a liquid to be analyzed. Within the housing there is provided a suitable source of radiant energy, such as a small lightbulb 21, provided with the usual condensing lens system 22 which directs the light from the lightbulb through a filter means, identified generally by numeral 23 and shown in an enlarged scale in FIG. 5. A support 24 for the cuvette enables the cuvette to be placed in the path of light rays from the filter means 23 so that they will impinge on the radiant energy detector 25, which may be of any standard type such as a photocell, or other similar device which transforms radiant energy into electrical energy and is connected in a circuit with the meter 26 having a movable pointer, or other indicating device 27.

Mounted upon a suitable support 28 within the housing is a horizontally positioned shaft 29 which carries a pair of axially spaced sprocket wheels 30. Also mounted within the housing are a pair of horizontally mounted elongated rollers 31 and 32 positioned in such a manner as to display an endless strip of flexible sheet material 33, the margins of which are perforated so as to engage with the teeth 34 of the sprockets 30. This sheet, as will be seen in FIG. 4, has upon its surface a plurality of indicia, such as the individually calibrated scales for the different analytical tests. For example, in FIG. 4, there is shown the appropriate scale 35 for testing glucose. Other scales for the test, as exemplified in the table above, are imprinted on other portions of the sheet (not shown) and these scales may be brought into position to be viewed through the window 17 in conjunction with the pointer 27 by rotation of the sprockets 30. Means is provided for changing the position of this sheet manually by the provision of a stub shaft 36 extending through one side of the housing and having an externally mounted actuating knob 37 attached thereto. The stub shaft also carries a pinion 38 in engagement with a gear 39 on the shaft 29.

The filter means 23, as viewed in FIG. 3, is shown in enlarged detail in FIG. 5 and in a preferred form comprises a series of filters 40, 41 and 42, each having a particular wave length isolating characteristic, mounted in side by side relationship in a supporting strip of material 43, which is mounted for horizontal sliding movement in a slideway 44 in such a manner that the respective filters may be selectively positioned in the path of light from the source 21 which passes through the cuvette 20 to the radiation detector 25.

The position of the filters may be controlled by means of linkage means including an arm 45 having a pivotal connection 46 at one end joining it to the support for the filters and pivotally connected at 47 to one end of another arm 48, this arm being mounted on a medial pivot 48 carried by a supporting bracket 50 attached to the interior of the housing. The other end of arm 48 is provided with a roller 51 which acts as a cam follower in operative engagement with the peripheral surface of a rotatable cam 52 fixed to the shaft 29. A coil spring 53 connected between the arm and the housing urges the roller into an engagement with the cam.

It will be noted that the cam is provided with a series of dwells 54, 55 and 56, for example, each of these dwells comprises surfaces which are concentric with the axis of rotation of the cam but spaced from the axis at differing radial distances and, as a result, rotation of the cam will position different ones of the filters 40, 41 and 42 in the light path depending upon which of the dwells on the cam is in engagement with the cam follower 51. Furthermore, it will also be apparent that rotation of the shaft 29 and the sprocket wheels 30 will move the sheet 33 for the purposes of positioning the appropriate scale 35 adjacent the pointer 27. Thus, when it is desired to conduct a specific colorimetric analysis of a liquid the positioning of the desired scale in the window 17 of the housing will at the same time bring into position in the light path the appropriate filter for carrying out the test in question. Having disclosed a preferred form in which the invention may be practiced it will be understood that changes and modifications may be made by those skilled in the art which would come within the scope of the annexed claims.

What is claimed is:

1. In direct reading filter photometers for use in performing a plurality of chemical analyses of liquid samples, wherein the concentration of a specific constituent of a sample for each particular analysis is proportional to the intensity of radiant energy of a particular frequency range transmitted through a sample, the combination including a source of radiant energy, transducer means positioned to be responsive to radiant energy from said source, a plurality of filter means including means to selectively position each of said filter means in the path of energy from said source to said transducer means for isolating a plurality of said particular frequency ranges of radiant energy emitted from said source, receptacle means for supporting a cuvette containing sample liquid to be analyzed in said path of radiant energy, said transducer means including pointer means responsive to radiant energy received from said source through a filter means and sample liquid and displaceable in proportion to the intensity of said received radiant energy, a unitary assembly comprising a plurality of individual scale means, each of said scale means being provided with indicia calibrated to indicate the concentration of a specific constituent related to a particular analysis as a function of the displacement of said pointer means in response to the intensity of radiant energy received from said source through a particular one of said filter means, means to selectively position each of said scale means for use with said pointer means, and selector means including a common drive means connected with all of said scale means to position a particular one of said filter means in said path of radiant energy and a particular one of said scale means with said pointer means for performing selectively each of said particular analyses, whereby the corresponding particular filter means will be positioned in said path of radiant energy by said common drive means when the latter is actuated to position a particular scale means for a particular analysis.

2. The invention as defined in claim 1, wherein said filter means includes a plurality of separate movable filter elements, and said scale means includes a plurality of separate movable scales, and said selector means includes linkage means for moving said filter elements and scales simultaneously.

3. The invention as defined in claim 2, wherein said selector means includes a rotatable actuator means, and said linkage means includes camming means rotatable wtih said actuator means for moving said filter elements into and out of the path of radiant energy.

4. The invention as defined in claim 3, wherein said filter elements are mounted on a slidable supporting element, said actuator means includes a rotatable shaft, said camming means includes a cam fixed on said shaft and a pivoted cam follower, in operative engagement with said cam and with said slidable supporting element.

5. The invention as defined in claim 1, wherein said filter means includes a filter element of the interference type.

6. The invention as defined in claim 1, wherein said filter means includes a filter element of the diffraction grating type.

7. The invention as defined in claim 1, wherein said filter means includes a filter element of the prism type.

8. The invention as defined in claim 1, wherein said pointer means is mounted on a fixed support, and said scale means includes a surface bearing a plurality of separate indicia thereon representing said ranges of analytical readings, said selector means including means for moving said surface to position each said indicia in said cooperative relationship with said pointer means.

9. The invention as defined in claim 8, wherein said surface includes a cylindrical drum mounted for rotation about its central axis.

10. The invention as defined in claim 9, wherein said surface includes a sheet of flexible material, and said selector means includes means for winding said surface on to and off of the cylindrical surface of said drum.

11. The invention as defined in claim 8, wherein said selector means includes a cam surface mounted for rotation with said drum and cam following means operatively engaging said cam surface and said variable filter means.

12. The invention as defined in claim 11, wherein said filter means inclues a plurality of separate filter elements.

References Cited

UNITED STATES PATENTS

| | | | |
|---|---|---|---|
| 2,048,554 | 7/1936 | Kuder | 356—189X |
| 2,447,985 | 8/1948 | Mass | 356—184 |
| 2,579,661 | 12/1951 | Freund | 356—189X |
| 2,706,428 | 4/1955 | Pfaffenberger et al. | 356—228X |
| 2,982,174 | 5/1961 | Crandell | 356—189X |
| 2,985,061 | 5/1961 | Krappatsch | 356—73 |
| 3,344,702 | 10/1967 | Wood et al. | 356—201 |

OTHER REFERENCES

Willard et al.: "Instrumental Methods of Analysis," D. Van Nostrand Co., New York, 1965, pp. 51–65.

RONALD L. WIBERT, Primary Examiner

R. J. WEBSTER, Assistant Examiner

U.S. Cl. X.R.

356—188, 189, 227, 228

UNITED STATES PATENT OFFICE
CERTIFICATE OF CORRECTION

Patent No. 3,561,878            Dated February 9, 1971

Inventor(s) Raymond W. Kiess

It is certified that error appears in the above-identified patent and that said Letters Patent are hereby corrected as shown below:

Column 6, after line 34, insert

-- 2,891,438    6/1959    Fuhrmann et al---88-14 --.

Signed and sealed this 8th day of June 1971.

(SEAL)
Attest:

EDWARD M. FLETCHER, JR.            WILLIAM E. SCHUYLER, JR
Attesting Officer                    Commissioner of Patents